A. Gwynne,
Pipe Coupling,
Nº 60,178. Patented Dec. 4, 1866.

Witnesses:
G. D. Law
Thos. B. Byrne

Inventor:
A. Gwynne

United States Patent Office.

IMPROVEMENT IN PIPE COUPLINGS.

ALFRED GWYNNE, OF NEW YORK, N. Y.

Letters Patent No. 60,178, dated December 4, 1866.

---

SPECIFICATION.

TO ALL WHOM IT MAY CONCERN:

Be it known that I, ALFRED GWYNNE, of the city of New York, in the county of New York, and State of New York, have invented a new and improved Joint for Water and other Pipes; and I do hereby declare that the following is a full, clear, and exact description thereof, and of its mode or manner of operation, reference being had to the accompanying drawings, and to the letters of reference marked thereon, and making a part of this specification.

The nature of my invention consists in an improved joint for, or an improved mode of, connecting the ends of water and other pipes, by which the use of clay, lead, and similar packing can be dispensed with, and by which the ends of such pipes can be quickly and cheaply connected together, and can also be easily disconnected, when necessary or desirable.

The ends of the pipes are made substantially in the usual manner, that is, one end of each section is cast or made for a little distance somewhat larger than the other end, so that the smaller end of each pipe can slip within the enlarged end of any other pipe. Upon the smaller end of the pipe there is also usually a rim or bead on the outside, for the purpose hereafter mentioned. In this space between such enclosing and enclosed tube, lead, clay, or other similar material or packing has heretofore been inserted and fixed, and it has been by the means of such packing that the joint has been made tight. By my method of fastening the ends of the pipe sections, I am, however, enabled to dispense with the use of lead, clay, or similar packing; and still secure as close and tight a joint, as when they are used. The joint is also very cheaply made, and the pipes can be very quickly put together, and also easily disconnected whenever necessary.

Figure 1:
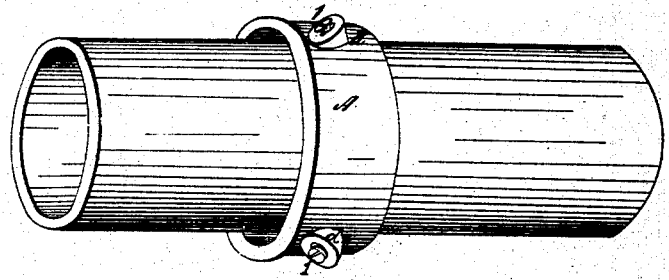
Figure 1 is a perspective view of the ends of two pipes when connected together.
Figure 2:
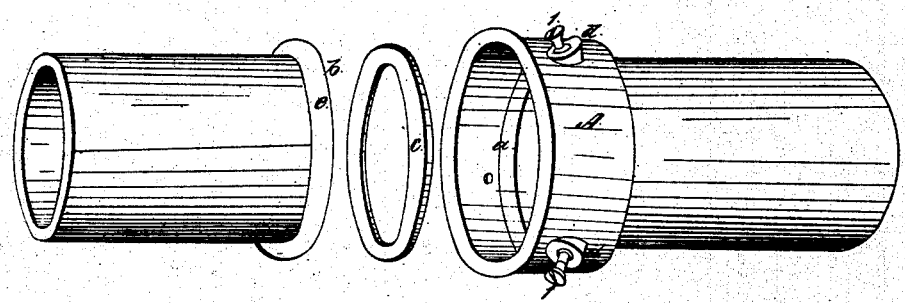
Figure 2 is a similar view, showing the ends of the pipes slightly separated, and the packing between them.
Figure 3:
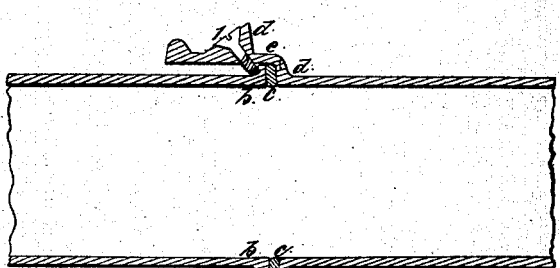
Figure 3 is a sectional view of fig. 1.

My improved joint is made substantially as follows:

The enlarged end, A, of the pipe section is made with a shoulder, $a$, upon its inner side, against which the end, $b$, of another pipe section abuts when the two are placed together. Between such shoulder of the enclosing pipe, and the end of the inserted pipe, I place a ring or disk, $c$, of rubber, gutta percha, felt, leather, or any suitable elastic or partially elastic substance. Through the enlarged part of the enclosing pipe, and just above the shoulder, $a$, I make a number of screw taps, $d\ d$, passing in a diagonal direction as shown in fig. 3, and so located or made that the ends of the screws, 1 1 1, passing through them or inserted therein, will strike and press against the rim or bead, $e$, on the end of the enclosed pipe. There should be at least three such screws or fastenings, but the number may be increased as required or desired. When the ends of the pipes are inserted one within the other, and the disk or ring of packing placed between the end of the inserted pipe and the shoulder formed in the other, the screws, 1 1 1, are driven, and these acting against the rim, $e$, or the lower end of the enclosed pipe and in a direction toward the shoulder, $a$, force the end of the inner pipe against the packing and both against the shoulder referred to, and thereby produce a close and tight joint capable of withstanding any pressure to which such pipes are ordinarily subjected. By increasing the number of screws the points of pressure will be increased, but for water and gas pipes of three or four inches in diameter three screws will be found amply sufficient, experiment having shown that that number of screws is sufficient to bring and hold the parts so closely together as to readily bear a pressure of fifteen pounds of steam without at all leaking.

What I claim as my invention, and desire to secure by Letters Patent, is—

1. The method of securing or fastening together the ends of water and other pipes, by means of the screws 1 1 1, or their equivalent, arranged and operating substantially as and for the purposes set forth.

2. In combination with such method of fastening the ends of such pipes, the use of an elastic ring or packing substantially as and for the purposes set forth.

A. GWYNNE.

Witnesses:
S. D. LAW,
THOS. B. BYRNE.